US007882081B2

(12) United States Patent
Stager et al.

(10) Patent No.: US 7,882,081 B2
(45) Date of Patent: Feb. 1, 2011

(54) OPTIMIZED DISK REPOSITORY FOR THE STORAGE AND RETRIEVAL OF MOSTLY SEQUENTIAL DATA

(75) Inventors: Roger Keith Stager, Livermore, CA (US); Don Alvin Trimmer, Livermore, CA (US); Craig Anthony Johnston, Livermore, CA (US); Yafen Peggy Chang, Fremont, CA (US); Jerry Kai Lau, Livermore, CA (US)

(73) Assignee: NetApp, Inc., Sunnyvale, CA (US)

( * ) Notice: Subject to any disclaimer, the term of this patent is extended or adjusted under 35 U.S.C. 154(b) by 108 days.

(21) Appl. No.: 10/231,617

(22) Filed: Aug. 30, 2002

(65) Prior Publication Data
US 2004/0044705 A1   Mar. 4, 2004

(51) Int. Cl.
*G06F 7/00* (2006.01)
(52) U.S. Cl. .................................... 707/691; 707/703
(58) Field of Classification Search ............... 707/8, 707/204, 205, 202, 4, 1–104.1, 691, 703; 711/112, 114, 162; 714/6, 4
See application file for complete search history.

(56) References Cited

U.S. PATENT DOCUMENTS

| | | | |
|---|---|---|---|
| 4,635,145 A | 1/1987 | Horie et al. | |
| 4,727,512 A | 2/1988 | Birkner et al. | |
| 4,775,969 A | 10/1988 | Osterlund | |
| 5,212,784 A | 5/1993 | Sparks | |
| 5,235,695 A | 8/1993 | Pence | |
| 5,297,124 A | 3/1994 | Plotkin et al. | |
| 5,325,695 A | 7/1994 | Seo et al. | |
| 5,438,674 A | 8/1995 | Keele et al. | |
| 5,455,926 A | 10/1995 | Keele et al. | |
| 5,485,321 A | 1/1996 | Leonhardt et al. | |
| 5,579,516 A | 11/1996 | Van Maren et al. | |
| 5,666,538 A | 9/1997 | DeNicola | |
| 5,673,382 A | 9/1997 | Cannon et al. | |
| 5,745,748 A | 4/1998 | Ahmad et al. | |
| 5,774,292 A | 6/1998 | Georgiou et al. | |
| 5,774,643 A * | 6/1998 | Lubbers et al. ............... 714/20 |
| 5,774,715 A | 6/1998 | Madany et al. | |
| 5,805,864 A | 9/1998 | Carlson et al. | |

(Continued)

FOREIGN PATENT DOCUMENTS

EP  1333379  4/2006

(Continued)

OTHER PUBLICATIONS

"Alacritus Software's Securitus I: Pointing the Way to Virtual Tape Libraries" Aberdeen Group, Inc., Mar. 2002.

(Continued)

*Primary Examiner*—James Trujillo
*Assistant Examiner*—Linh Black
(74) *Attorney, Agent, or Firm*—Perkins Coie LLP (57) ABSTRACT

A system for the storage and retrieval of data files includes a data disk, a configuration disk and a controller. Each data file includes one or more data blocks, each data block comprising a data section. The data disk stores the data blocks and is divided into a plurality of block groups. The configuration disk stores a copy of at least a portion of the corresponding meta-data. The controller controls both the data disk and the configuration disk.

27 Claims, 3 Drawing Sheets

U.S. PATENT DOCUMENTS

| | | | |
|---|---|---|---|
| 5,809,511 | A | 9/1998 | Peake |
| 5,809,543 | A * | 9/1998 | Byers et al. ................. 711/162 |
| 5,832,515 | A * | 11/1998 | Ledain et al. ............... 707/202 |
| 5,854,720 | A | 12/1998 | Shrinkle et al. |
| 5,859,979 | A * | 1/1999 | Tung et al. .................. 709/228 |
| 5,864,346 | A | 1/1999 | Yokoi et al. |
| 5,872,669 | A | 2/1999 | Morehouse et al. |
| 5,875,479 | A | 2/1999 | Blount et al. |
| 5,911,779 | A * | 6/1999 | Stallmo et al. ................. 714/6 |
| 5,913,062 | A * | 6/1999 | Vrvilo et al. ................ 719/321 |
| 5,949,970 | A * | 9/1999 | Sipple et al. ................... 714/15 |
| 5,961,613 | A | 10/1999 | DeNicola |
| 5,963,971 | A | 10/1999 | Fosler et al. |
| 5,974,424 | A * | 10/1999 | Schmuck et al. ............ 707/201 |
| 5,974,503 | A * | 10/1999 | Venkatesh et al. ........... 711/114 |
| 6,021,408 | A * | 2/2000 | Ledain et al. ................... 707/8 |
| 6,023,709 | A | 2/2000 | Anglin et al. |
| 6,029,179 | A | 2/2000 | Kishi |
| 6,041,329 | A | 3/2000 | Kishi |
| 6,044,442 | A | 3/2000 | Jesionowski |
| 6,049,848 | A | 4/2000 | Yates et al. |
| 6,061,309 | A | 5/2000 | Gallo et al. |
| 6,061,820 | A * | 5/2000 | Nakakita et al. ............ 714/751 |
| 6,067,587 | A | 5/2000 | Miller et al. |
| 6,070,224 | A | 5/2000 | LeCrone et al. |
| 6,098,148 | A | 8/2000 | Carlson |
| 6,128,698 | A | 10/2000 | Georgis |
| 6,131,142 | A | 10/2000 | Kamo et al. |
| 6,131,148 | A | 10/2000 | West et al. |
| 6,163,856 | A * | 12/2000 | Dion et al. ...................... 714/4 |
| 6,173,359 | B1 | 1/2001 | Carlson et al. |
| 6,195,730 | B1 | 2/2001 | West |
| 6,225,709 | B1 | 5/2001 | Nakajima |
| 6,247,096 | B1 | 6/2001 | Fisher et al. |
| 6,260,110 | B1 | 7/2001 | LeCrone et al. |
| 6,266,784 | B1 | 7/2001 | Hsiao et al. |
| 6,269,423 | B1 | 7/2001 | Kishi |
| 6,269,431 | B1 | 7/2001 | Dunham |
| 6,282,609 | B1 | 8/2001 | Carlson |
| 6,289,425 | B1 | 9/2001 | Blendermann et al. |
| 6,292,889 | B1 * | 9/2001 | Fitzgerald et al. ............... 713/1 |
| 6,301,677 | B1 | 10/2001 | Squibb |
| 6,304,880 | B1 | 10/2001 | Kishi |
| 6,304,882 | B1 * | 10/2001 | Strellis et al. ................ 707/202 |
| 6,317,814 | B1 | 11/2001 | Blendermann et al. |
| 6,324,497 | B1 | 11/2001 | Yates et al. |
| 6,327,418 | B1 | 12/2001 | Barton |
| 6,336,163 | B1 | 1/2002 | Brewer et al. |
| 6,336,173 | B1 | 1/2002 | Day et al. |
| 6,339,778 | B1 | 1/2002 | Kishi |
| 6,341,329 | B1 | 1/2002 | LeCrone et al. |
| 6,343,342 | B1 * | 1/2002 | Carlson ....................... 711/112 |
| 8,336,173 | | 1/2002 | Day et al. |
| 6,353,837 | B1 * | 3/2002 | Blumenau ................... 707/205 |
| 6,354,748 | B1 * | 3/2002 | Vrvilo ......................... 709/204 |
| 6,360,232 | B1 | 3/2002 | Brewer et al. |
| 6,385,706 | B1 | 5/2002 | Ofek et al. |
| 6,389,503 | B1 | 5/2002 | Georgis et al. |
| 6,408,359 | B1 * | 6/2002 | Ito et al. ...................... 711/114 |
| 6,487,561 | B1 * | 11/2002 | Ofek et al. ................... 707/204 |
| 6,496,791 | B1 | 12/2002 | Yates et al. |
| 6,499,026 | B1 | 12/2002 | Rivette et al. |
| 6,546,384 | B2 | 4/2003 | Shaath et al. |
| 6,557,073 | B1 | 4/2003 | Fujiwara |
| 6,557,089 | B1 | 4/2003 | Reed et al. |
| 6,578,120 | B1 | 6/2003 | Crockett et al. |
| 6,615,365 | B1 * | 9/2003 | Jenevein et al. ................. 714/6 |
| 6,625,704 | B2 | 9/2003 | Winokur |
| 6,654,912 | B1 | 11/2003 | Viswanathan et al. |
| 6,658,435 | B1 | 12/2003 | McCall |
| 6,690,268 | B2 * | 2/2004 | Schofield et al. ............ 340/438 |
| 6,694,447 | B1 | 2/2004 | Leach et al. |
| 6,725,331 | B1 | 4/2004 | Kedem |
| 6,766,520 | B1 | 7/2004 | Rieschl et al. |
| 6,779,057 | B2 | 8/2004 | Masters et al. |
| 6,779,058 | B2 | 8/2004 | Kishi et al. |
| 6,779,081 | B2 * | 8/2004 | Arakawa et al. ............. 711/112 |
| 6,816,941 | B1 | 11/2004 | Carlson et al. |
| 6,816,942 | B2 | 11/2004 | Okada et al. |
| 6,834,324 | B1 | 12/2004 | Wood |
| 6,850,964 | B1 | 2/2005 | Brough et al. |
| 6,877,016 | B1 | 4/2005 | Hart et al. |
| 6,915,397 | B2 | 7/2005 | Lubbers et al. |
| 6,931,557 | B2 | 8/2005 | Togawa |
| 6,938,089 | B1 | 8/2005 | Slaby et al. |
| 6,950,263 | B2 | 9/2005 | Suzuki et al. |
| 6,957,291 | B2 | 10/2005 | Moon et al. |
| 6,959,368 | B1 | 10/2005 | St. Pierre et al. |
| 6,973,369 | B2 | 12/2005 | Trimmer et al. |
| 6,973,534 | B2 | 12/2005 | Dawson |
| 6,978,325 | B2 | 12/2005 | Gibble |
| 6,988,109 | B2 | 1/2006 | Stanley et al. |
| 7,032,126 | B2 | 4/2006 | Zalewski et al. |
| 7,032,131 | B2 * | 4/2006 | Lubbers et al. ................ 714/16 |
| 7,055,009 | B2 | 5/2006 | Factor et al. |
| 7,072,910 | B2 * | 7/2006 | Kahn et al. .................. 707/201 |
| 7,096,331 | B1 | 8/2006 | Haase et al. |
| 7,100,089 | B1 | 8/2006 | Phelps |
| 7,107,417 | B2 | 9/2006 | Gibble et al. |
| 7,111,136 | B2 | 9/2006 | Yamagami |
| 7,117,324 | B2 | 10/2006 | Scheid |
| 7,127,388 | B2 | 10/2006 | Yates et al. |
| 7,127,577 | B2 | 10/2006 | Koning et al. |
| 7,143,307 | B1 * | 11/2006 | Witte et al. ..................... 714/6 |
| 7,152,077 | B2 | 12/2006 | Veitch et al. |
| 7,155,586 | B1 | 12/2006 | Wagner et al. |
| 7,200,546 | B1 | 4/2007 | Nourmohamadian et al. |
| 7,389,313 | B1 | 6/2008 | Hsieh et al. |
| 2001/0047447 | A1 * | 11/2001 | Katsuda ........................ 711/1 |
| 2002/0004835 | A1 | 1/2002 | Yarbrough |
| 2002/0016827 | A1 | 2/2002 | McCabe et al. |
| 2002/0026595 | A1 | 2/2002 | Saitou et al. |
| 2002/0095557 | A1 | 7/2002 | Constable et al. |
| 2002/0099907 | A1 * | 7/2002 | Castelli et al. ............... 711/113 |
| 2002/0133491 | A1 * | 9/2002 | Sim et al. ...................... 707/10 |
| 2002/0144057 | A1 | 10/2002 | Li et al. |
| 2002/0163760 | A1 | 11/2002 | Lindsey et al. |
| 2002/0166079 | A1 | 11/2002 | Ulrich et al. |
| 2002/0171546 | A1 | 11/2002 | Evans et al. |
| 2002/0174244 | A1 * | 11/2002 | Beckwith et al. ............ 709/231 |
| 2002/0191608 | A1 * | 12/2002 | Lenell et al. ................. 370/389 |
| 2002/0199129 | A1 | 12/2002 | Bohrer et al. |
| 2003/0004980 | A1 | 1/2003 | Kishi et al. |
| 2003/0014568 | A1 | 1/2003 | Kishi et al. |
| 2003/0037211 | A1 | 2/2003 | Winokur |
| 2003/0044834 | A1 | 3/2003 | Daly et al. |
| 2003/0061456 | A1 * | 3/2003 | Ofek et al. ................... 711/162 |
| 2003/0097462 | A1 * | 5/2003 | Parent et al. ................. 709/236 |
| 2003/0108164 | A1 * | 6/2003 | Laurin et al. ............. 379/88.01 |
| 2003/0120476 | A1 | 6/2003 | Yates et al. |
| 2003/0120676 | A1 | 6/2003 | Holavanahalli et al. |
| 2003/0126388 | A1 | 7/2003 | Yamagami |
| 2003/0135672 | A1 | 7/2003 | Yip et al. |
| 2003/0149700 | A1 | 8/2003 | Bolt |
| 2003/0182301 | A1 * | 9/2003 | Patterson et al. ............ 707/102 |
| 2003/0182350 | A1 | 9/2003 | Dewey |
| 2003/0188208 | A1 | 10/2003 | Fung |
| 2003/0217077 | A1 * | 11/2003 | Schwartz et al. ............ 707/200 |
| 2003/0225800 | A1 | 12/2003 | Kavuri |
| 2004/0015731 | A1 | 1/2004 | Chu et al. |
| 2004/0098244 | A1 | 5/2004 | Dailey et al. |
| 2004/0181388 | A1 | 9/2004 | Yip et al. |
| 2004/0181707 | A1 | 9/2004 | Fujibayashi |
| 2005/0010529 | A1 | 1/2005 | Zalewski et al. |

| | | | |
|---|---|---|---|
| 2005/0044162 A1 | 2/2005 | Liang et al. | |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066222 A1 | 3/2005 | Rowan et al. | |
| 2005/0066225 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0144407 A1 | 6/2005 | Colgrove et al. | |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 | 3/2006 | Matze et al. | |
| 2006/0047925 A1 | 3/2006 | Perry | |
| 2006/0047989 A1 | 3/2006 | Delgado et al. | |
| 2006/0047998 A1 | 3/2006 | Darcy | |
| 2006/0047999 A1 | 3/2006 | Passerini et al. | |
| 2006/0143376 A1 | 6/2006 | Matze et al. | |

FOREIGN PATENT DOCUMENTS

| | | |
|---|---|---|
| EP | 1 671 231 | 6/2006 |
| EP | 1 671231 | 6/2006 |
| EP | 1671231 | 6/2006 |
| WO | WO 99/03098 | 1/1999 |
| WO | WO 1999/03098 | 1/1999 |
| WO | WO 99/06912 | 2/1999 |
| WO | WO 1999/06912 | 2/1999 |
| WO | WO 2005/031576 | 4/2005 |
| WO | WO 2006/023990 | 3/2006 |
| WO | WO 2006/023991 | 3/2006 |
| WO | WO 2006/023992 | 3/2006 |
| WO | WO 2006/023993 | 3/2006 |
| WO | WO 2006/023994 | 3/2006 |
| WO | WO2006/023995 | 3/2006 |
| WO | WO 2006/023995 | 3/2006 |

OTHER PUBLICATIONS

"Product Brief: Rhapsody/Alacritus-Secritus/XPath Virtual Tape in the Fabric" The Enterprise Storage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc. Jun. 25, 2001.
"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library for Legato NetWorker Data Protection Solution" Alacritus Software, Inc., Jan. 8, 2002.
"Alacritus Software Announces Securitus I, the Industry's First Virtual Tape Library Solution: Securitus I Heralds Advent of 'Disruptive Technology'that Serves as Replacement to Tape Libraries" Alacritus Software, Inc., Apr. 9, 2002.
Biggar, Heidi, "Disk and Tape Forge New Partnership in Backup Arena" InfoStor, Nov. 2001.
Preston, W. Curtis, "Surprise! Cheap Disks Cure Slow Backup" Storage Magazine, Jun. 1, 2002.
"Alacritus, Hitachi CP and Nissho Team to Create Virtual Tape Library" Jun. 25, 2001.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup performance and Scalability" Alacritus Software, Jul. 8, 2002.
Camphuisen, Alicia, "Hitachi Inks OEM Deal with Legato" Jul. 17, 2002.
"Alacritus Announces Disk-Based Successor to Tape" Aug. 21, 2002.
Biggar, Heidi, "Alacritus Enables Disk-Based Backup" InfoStor, Sep. 2001.
"Securitus I White Paper: Disk Based Data Protection for Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Software, Inc. Sep. 2001.
"Alacritus Software's Securitus I: Pointing the Way to Virtual Tape Libraries" Aberdeen Group, Inc., Mar. 2002, 8 pages.
"Product Brief: Rhapsody/Alacritus-Securitus/XPath Virtual Tape in the Fabric" The Enterprise Storage Group, Aug. 2002, 3 pages.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001, 2 pages.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001, 3 pages.
"Hitachi CP, Nissho, and Alacritus Software Bring Virtual Tape Library Appliance Solution to Market; Three Companies Join to Deliver VTLA Smart Guard—A Disk Subsystem Product that Functions as a Virtual Storage Tape Library" Alacritus Software, Inc., Oct. 3, 2001, 3 pages.
Trimmer, Don, "Tape Free Backup/Recovery: Requirements and Advantages: Virtualization Technology Will Encompass Many Applications, One of the Most Significant Possibly Being Backup/Recovery" InfoSlor, Mar. 2002, 5 pages.
"Alacritus Software Announces Virtual Tape Library for Legato NetWorker Data Protection Solution" Alacritus Software, Inc., Jan. 8, 2002, 3 pages.
"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002, 2 pages.
Biggar, Heidi, "Disk and Tape Forge New Partnership in Backup Arena" InfoStor, Nov. 2001, 3 pages.
Preston, W. Curtis, "Surprise! Cheap Disks Cure Slow Backup" Storage Magazine, Jun. 1, 2002, 5 pages.
"Alacritus, Hitachi CP and Nissho Team to Create Virtual Tape Library" internetnews.com, Jun. 25, 2001, 3 pages.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup performance and Scalability" Alacritus Software, Jul. 8, 2002, 3 pages.
Camphuisen, Alicia, "Hitachi Inks OEM Deal with Legato" Knapp Comm., Jul. 17, 2002, 2 pages.
"Alacritus Announces Disk-Based Successor to Tape" Knapp Comm., Aug. 21, 2002, 2 pages.
Biggar, Heidi, "Alacritus Enables Disk-Based Backup" InfoStor, Sep. 2001, 2 pages.
"Securitus I White Paper: Disk Based Data Protection for Alacritus Software" Alacritus Software, Inc., Jul. 2001, 6 pages.
"Alacritus Software FAQs" Alacritus Software, Inc., Jul. 2001, 3 pages.
"Virtual Tape Library Technology Brochure" Alacritus Software, Inc., July 2001, 5 pages.
"Disk-Based Data Protection" Alacritus Software, Inc., Sep. 2001, 1 page.
Payack, Paul JJ "Alacritus Lines Up OEM Partners for Virtual Tape Library Push" The (451) Storage & Systems, Oct. 4, 2002, pp. 1-5.
Baltazar, Henry "Weaving Apps into SAN Fabric", eWEEK, Mar. 24, 2003, pp. 1-2.

* cited by examiner

OPTIMIZED DISK REPOSITORY FOR THE STORAGE AND RETRIEVAL OF MOSTLY SEQUENTIAL DATA

BACKGROUND

The present invention is generally related to storage systems. More particularly, the invention is directed to a disk-based storage system which is optimized for storage and retrieval of sequential data.

Typical disk file systems such as the Microsoft NTFS, Solaris UFS and the Veritas VxFS are designed for the general-purpose storage of data. In particular, disk file systems are architected to handle the simultaneous reading and writing of a large number of both small and large files. To do this efficiently, file systems must implement intricate locking techniques, must be able to cope with random behavior and must be able to perform effectively under a variety of different conditions. This general-purpose design is adequate for some applications but can lead to significant overhead in complexity, performance and capacity.

In practice, storage intensive applications can be severely limited by general-purpose file systems. This is particularly true for applications that rely on mostly sequential data. Storing and retrieving data in a disk-based backup and data protection environment is an example of a specialized application that suffers from limitations in general-purpose file systems. First, general-purpose file systems typically only scale to less than one terabyte, whereas backup data sets can be significantly larger. Second, general-purpose file systems are fragile, in that they have difficulties in dealing with partial failures. Third, general-purpose file systems handle large streams of data inefficiently. Finally, general-purpose file systems, by their nature, cannot implement special purpose functionality because a feature that may be advantageous for one application may be disastrous for another.

SUMMARY

The Journaled Object Store (JOS) system of the present invention is a disk repository for the storage of primarily sequential data. The JOS is optimized to handle sequential data, such as is handled by a physical tape drive or a virtual tape drive. The JOS system stores data in two places: 1) a data disk, where all the data together with self-describing meta-data is stored; and 2) a configuration disk, where configuration data and a copy of some of the meta-data are stored. The configuration disk is preferably resident on a non-volatile compact flash disk or other solid-state persistent storage medium. The JOS takes advantage of specialized knowledge of usage patterns to provide levels of reliability, robustness, performance, scalability, availability and data integrity exceeding that of a standard disk file system.

DETAILED DESCRIPTION OF THE PREFERRED EMBODIMENT(S)

The present invention will be described with reference to the drawing figures where like numerals represent like elements throughout. It should be noted that the terminology "appliance" as used hereinafter refers to any electronic system which implements the present invention, including the controller and the disk. An example of such an appliance is an Intel-based server running virtual tape library software. In this example the JOS is the storage repository for virtual tape and virtual tape library data. In another example, the JOS is the core of a high performance multimedia server for recording and streaming digital media over a network.

It should also be noted that the term "meta-data" is the data that describes where on a disk, (i.e. on which block regions), a particular data file is stored, along with other aspects of the data file. Meta-data does not include the contents of the data file. Meta-data is essentially data that describes the data file. The terminology "configuration data" is typically associated with system settings and behavior. For example, the number of block groups used by a system could be configuration data, if this number is configurable. The use of the term meta-data herein is intended to encompass both meta-data and configuration data.

The system of the present invention uses one or more data disks for storing data in the form of data objects. As will be described in detail hereinafter, the layout of the data disk plays an important role in providing reliable and efficient operation of the system.

Figure 1:
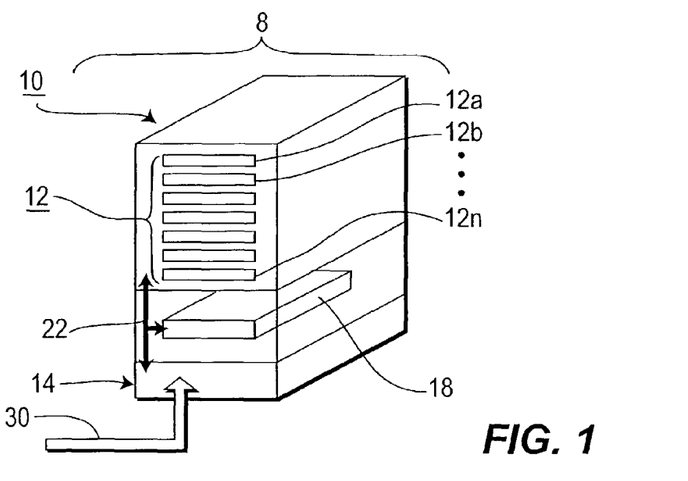
FIG. 1 is Journaled Object Store (JOS) system in accordance with an embodiment of the invention.

Referring to FIG. 1, the JOS system 8 of the present invention comprises a primary unit 10, having a data disk 12 comprising one or more hard disks 12a-12n, a controller 14 and a configuration disk 18. The hard disks 12a-12n could be RAID disk arrays, disk arrays, small computer system interface (SCSI) disks, advanced technology attachment (ATA) disks, Serial ATA, fiber channel (FC) disks, partitions of a single disk and any other present or future developments in storage technology. The configuration disk 18 is preferably a non-volatile flash disk or other non-volatile disk.

The controller 14 communicates with the data disk 12 and the configuration disk 18 via a communication interface 22 (or bus). As those of skill in the art are aware, there are many types of communication interface technologies that enable data to move between PCs or servers and peripherals, such as hard disk drives. SCSI is a bus architecture which allows multiple devices such as disks, tape drives, libraries, etc. to be daisy-chained. This technology is typically found in high-end storage devices. ATA, which is typically found in PCs, is less costly than SCSI but is also slower for random access and less flexible. Fibre Channel (FC) is a network technology for block-oriented streams, used in storage area networks, which allows for further distances and more complex and flexible topologies.

The JOS system 8 receives data via an external communication interface 30, (which may be the same or a different type of technology than the communication interface 12), and selectively stores the data and related configuration data into two separate places: 1) the data disk 12; and 2) the configuration disk 18. Both of these storage mediums will be described in further detail hereinafter. It should also be noted that although the data disk 12 and the configuration disk 18 will be described as physically separate components, they may actually be located on the same disk and separated logically via one or more disk partitions.

Figure 2:
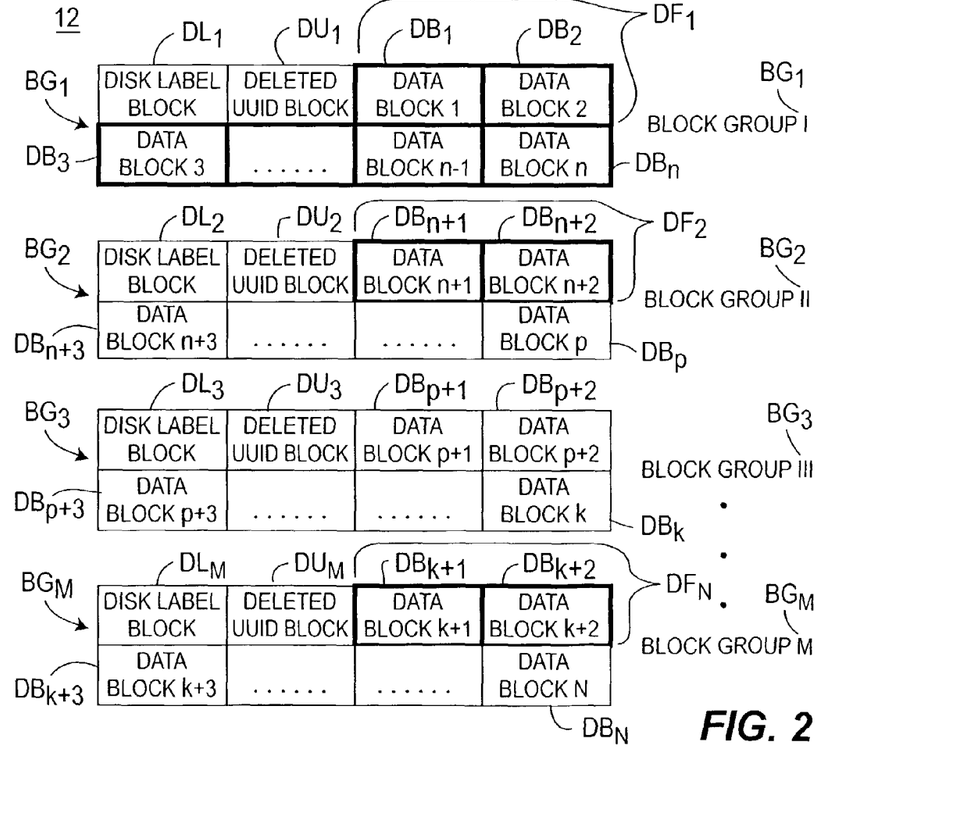
FIG. 2 shows the layout of a data disk in accordance with an embodiment of the invention.

Referring to FIG. 2, the layout of the data disk 12 is shown. Each data disk 12 is a logically self-contained storage unit, such as a RAID array, a disk subsystem or an individual disk/partition. The storage capacity is preferably divided into a number of block groups $BG_1$-$BG_M$. A preferred embodiment is shown in FIG. 2 where M block groups are used. As will be explained in detail hereinafter, the use of block groups $BG_1$-$BG_M$ helps to provide contiguous allocations of data blocks for storage of data. As such, the number of block groups $BG_1$-$BG_M$ can either be fixed, or can be adjusted dynamically depending on external parameters, such as the number of available logical unit number (LUN) groups on the data disk 12 or other practical considerations. A single device can consist of multiple sub-components or units. For example, a disk array can consist of multiple RAID groups. In order to address a specific group on an FC network, an application needs to specify the SCSI ID, (which is the ID of the disk array), along with the LUN that specifies the exact unit within the array. Because each RAID group (LUN) can handle a single disk failure, storing certain information on multiple LUNs greatly improves fault-tolerance. But more importantly, by spreading out disk operations to multiple LUNs, performance is greatly increased. Each block group $BG_1$-$BG_M$ includes a disk label block $DL_1$-$DL_N$, a deleted universally unique identifier (Uuid) block $DU_1$-$DU_N$ and a plurality of data blocks $DB_1$-$DB_N$.

The "objects" stored on the data disk 12 comprise data files DF. A data file DF is a logical chain of one or more data blocks DB. Although it is preferable that the chain of data blocks are contiguously located, this is not a requirement. For example, a chain of data blocks $DB_1$-$DB_{n-1}$ have been graphically highlighted as a data file $DF_1$. A data file DF can span across multiple hard disks 12a-12n, depending on space and bandwidth availability. As will be explained in detail hereinafter, data streams are accepted sequentially and a large area, (i.e., 1 GB or greater), is allocated at a time. Within that area the 1 MB data blocks are generally contiguous. However, since multiple sequential data streams can come in at the same time, it is possible to get slight fragmentation, especially as the data disk 12 gets full or when files are deleted. Accordingly, to further promote locality of access, a plurality of block groups $BG_1$-$BG_M$ are used. For example, if four (4) data streams are incoming and four (4) block groups $BG_1$-$BG_4$ are used, each data stream goes to a different block group $BG_1$-$BG_4$.

A block allocation procedure implemented by the controller 14 allocates different data files DF to different block groups BGs when a request, (i.e., the first "write" operation, or a "create file" operation) is received. This is essentially a request that comes in from an outside entity to place a data file DF onto the data disk 12 (or "object store"). In the case where the system is implemented on a virtual tape library, the request comes in as a write to tape and the system 8 converts it in the appliance to a write to the data disk 12.

Once the first write occurs, the block allocation procedure prefers to keep additional data blocks DB of a particular data file DF, within the same block group BG to promote locality for efficient access. For example, when a request for storage of the first data block $DB_1$ of the first data file $DF_1$ comes in, it is stored in the first block group $BG_1$. Subsequent data blocks $DB_2$-$DB_n$ are forwarded to the first block group $BG_1$ to be sequentially stored with the data file $DF_1$. However, when the first data block $DB_{n+1}$ of the second data file $DF_2$ comes in, it is preferably stored in the second block group $BG_2$ even though there may be remaining open data blocks in the first block group $BG_1$, (for example, data block n). Subsequent data files DF are sent to different block groups BGs as new data streams are accepted. For example, if five (5) data streams and only four (4) block groups BGs exist, the fifth data stream could be forwarded to the first block group $BG_1$.

The block allocation procedure applies heuristics when routing data files DF to the data disk 18. First, the block allocation procedure distributes data files DFs equally among block groups BGs, for example in a "round robin" fashion. Alternatively, the block allocation procedure may be based upon the file size and may attempt to use approximately the same amount of space in each block group BG. Second, once the block group BG is determined, the block allocation procedure allocates a large area (such as 1 GB) of memory to the data file DF instead of just a single 1 MB block of memory, and writes the data block at the beginning of this large allocation area. For further data blocks DBs of the same data file DF, the controller 14 writes them contiguously into the same large allocation area. Once the allocation area is full, a new large allocation area of is allocated, ideally contiguously to the first one. The block allocation procedure in accordance with the present invention improves the chances for an efficient layout for specific access pattern; a comparably small number of large sequential reads and writes.

The disk label block $DL_1$-$DL_N$ identifies the disk size and format version information. The disk label DL also contains the appliance identification as well as other parameters that define the disk layout. A data disk 12 with a Securitus I identifier in the disk label DL is henceforth referred to simply as a JOS disk. To assist with data recovery in case of disk label DL damage, the disk label $DL_1$-$DL_N$ is preferably repeated at the beginning of each block group $BG_1$-$BG_M$. Possible disk label meta-data and its purpose are shown in Table 1.

It should be noted that although the meta-data listed in the tables and explained in accordance with the present invention may be utilized by the present invention in a novel manner, the definition of each type of meta-data is well-known in the art.

TABLE 1

| Disk Label Meta-Data | Purpose |
| --- | --- |
| Device Magic No. | For validation of disk |
| Version | Layout version refers to how blocks are laid out on disk. When a disk is imported, it is important to know the version of the layout to be able to find all the data |
| Device uuid | Uuid for the device |
| Data Store uuid | For identifying the storage pool, which is a collection of multiple physical disks in one logical pool. Sometimes it is useful to assign specific disks to specific uses or customers to keep the data separate or to route time critical data to a pool of SCSI disks and other data to a pool of ATA disks. |
| H/W uuid | For identifying the actual physical hardware |
| Appliance uuid | For identifying the appliance (i.e., the entire set of hardware and software) |
| BandWidth | Current bandwidth used |
| BlockSize | The size of the block |
| Total blocks on the disk | Total number of blocks on the disk |
| Category | This flag differentiates between RAID arrays and JBODs, (Just a Bunch Of Disks). In essence, this indicates whether or not the disks are in a fault-tolerant configuration. |
| Function | In the case of RAID array, (particularly RAID 3 or 4), it is useful to know which disks are used for data and which disk stores the parity information. In RAID 5, both data as well as parity is stored on all disks. |

In order to make the system more efficient, the disk label block $DL_1$-$DL_M$ is written at a known location on each data disk 12. Although it is shown in FIG. 2 as being repeated at the beginning of each block group $BG_1$-$BG_M$, this information may be written to multiple different locations. When a JOS disk gets imported into the system, the first thing the system 8 does is to look for the disk label block $DL_1$-$DL_M$ to confirm that it is a JOS disk and to confirm the version of the software used to create the JOS disk. Writing the disk label blocks $DL_1$-$DL_M$ to a specific location increases efficiency since the system 8 would otherwise need to scan the entire data disk 12 before finding the necessary disk label blocks $DL_1$-$DL_M$. This location is reserved and does not interfere with any other component of the system 8.

The deleted Uuid block $DU_1$-$DU_M$ records the identity of data files DF that have previously used data blocks $DB_1$-$DB_N$ and have later been deleted. For the provision of reliable disaster recovery, the deleted Uuid blocks $DU_1$-$DU_M$ are preferably also repeated in each block group $BG_1$-$BG_M$. The deleted Uuid blocks $DU_1$-$DU_M$ preferably store the identity of deleted data files DFs that previously used data blocks DBs in that particular block group $BG_1$-$BG_M$. Alternatively, the deleted Uuid blocks $DU_1$-$DU_M$ may store the identity of deleted data files DFs (or deleted data blocks DBs) that previously used data blocks DBs in all of the block groups $BG_1$-$BG_M$. In this case, the deleted Uuid blocks $DU_1$-$DU_M$ will be identical, and are just repeated in each block group $BG_1$-$BG_M$. Storing the information repeatedly increases fault tolerance at the expense of performance.

The deleted Uuid blocks $DU_1$-$DU_M$ identify blocks which have a consistent header and trailer but belong to data blocks $DB_1$-$DB_N$ that have been deleted. During disaster recovery, the information in the header and trailer of data blocks DBs can be used during reconstruction of the configuration of the appliance prior to the last consistent state prior to the crash. The problem is that deleted data blocks DBs on a disk look exactly the same as non-deleted data blocks DBs. Accordingly, during disaster recovery, a data recovery system typically has no way of knowing which data blocks DBs are still active and which data blocks DBs are deleted. However, in accordance with the present invention, the system 8 determines the active data blocks DBs by looking at the deleted Uuid blocks $DU_1$-$DU_M$. The system 8 then knows that only the data blocks DBs that have a header and trailer and are not part of the deleted Uuid blocks $DU_1$-$DU_M$ are valid data. Accordingly, the Uuid blocks $UB_1$-$UB_M$ are not used to recreate the data, but only to indicate that particular data block DB is no longer important.

Figure 3:
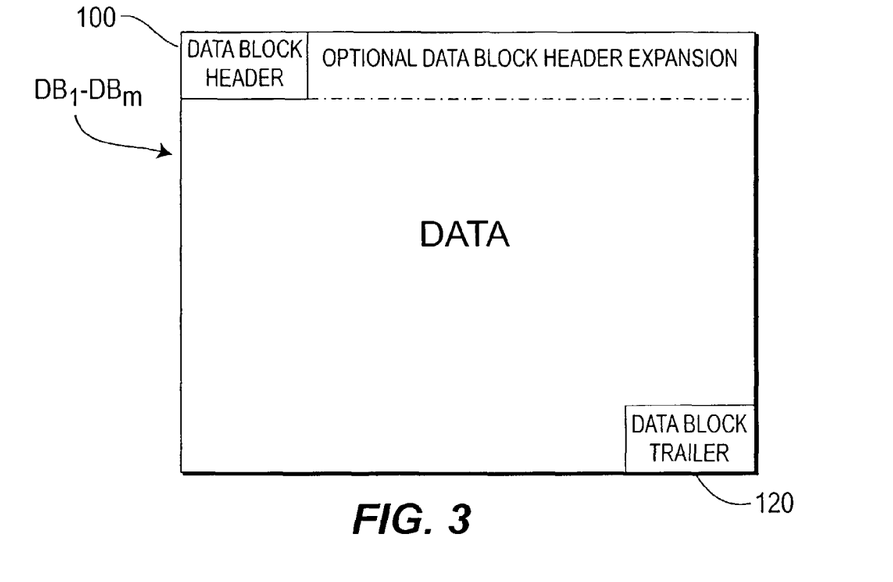
FIG. 3 shows a data block in accordance with an embodiment of the invention.

The data blocks $DB_1$-$DB_N$ will be explained with reference to FIG. 3. A data block $DB_1$-$DB_N$ is the base unit of storage space on the data disk 12. Preferably, each data block $DB_1$-$DB_N$ is defined to be 1 MB in size. Such large block sizes are well suited for efficient storage and retrieval of mostly sequential data. However, greater or lesser sizes may be allocated in order to maximize efficiency of the system 8 for a particular application. As shown in FIG. 3, in a preferred embodiment, each data block $DB_1$-$DB_N$ includes a header 100 and trailer 120, both of which are embedded within the 1 MB boundary. The header 100 may be extended for variable length data. This provides the system 8 with the ability to handle certain information about files, (the file type, etc.), which could have a variable length. The header 100 and trailer 120 sections verify the integrity of a particular data block DB. The meta-data of the stored data block $DB_1$-$DB_M$ is written in the header 100. Preferably, headers 100 and trailers 120 are written in a non-proprietary XML format and contain the device Uuid.

Different types of meta-data of the data block $DB_1$-$DB_N$ are shown in Table 2, along with their primary purpose. Some of the meta-data types (identified as TAPE) are specific to a particular application (i.e., a virtual tape library application), but they can easily be changed to fit other needs by a person skilled in the art. The other meta-data types (identified as JOS) are particular to the system 8 of the present invention. It should be understood that these are examples of types of meta-data that may be utilized by the system 8 of the present invention without departing from the spirit and scope of the present invention.

TABLE 2

| Data Block Meta-Data | Purpose |
| --- | --- |
| Block Header | |
| JOS Magic No. | Unique identifier |
| JOS Data File Uuid | Identifies the file the block is part of |
| JOS Storage Device Uuid | Identifies the storage device |
| JOS Volume Uuid | Identifies the volume w/in the storage device |
| TAPE Appliance Uuid | Identifies the appliance |
| JOS Volume Pool Uuid | Identifies the volume pool (mult. vols) |
| TAPE Customer Name | Appliance user information |
| TAPE Customer Uuid | User identifier |
| TAPE Library Name | Name of the particular tape library |
| TAPE Library Uuid | Library identifier |
| JOS Used | Size of used blocks |
| JOS Capacity | Total available capacity |
| JOS Bandwidth | Available bandwidth |
| JOS Write Protected | Flag for write protection |
| JOS Label | Disk Label |
| TAPE Quick Load | Performance enhancement flag |
| TAPE Imported | Indicates if part of appliance |
| TAPE File Marks | Records tape file marks |
| TAPE Record Marks | Records tape record marks |
| JOS Header Length | Indicates the length of the header |
| JOS File Offset | Indicates the offset w/in the file |
| JOS DataFile Sequence Change Number (SCN) | Ordered sequence number, indicates where the block belongs in the file |
| JOS Resource Fork Length | Indicates the length of the header extension |
| Block Trailer Meta-Data | |
| JOS Data File Uuid | Identifies the file the block is part of |
| JOS Storage Device Uuid | Identifies the storage device |
| JOS Header Length | Indicates the length of the header |
| JOS File Offset | Indicates the offset w/in the file |
| JOS DataFile Sequence Change Number (SCN) | Ordered sequence number, indicates where the block belongs in the file |
| JOS Resource Fork Length | Indicates the length of the header extension |
| JOS Unused bytes in the block | Slack space before the trailer |

As explained hereinbefore, the data blocks $DB_1$-$DB_N$ are coupled together as a logical chain of blocks to generate a single stream of data associated with a particular data file DF, (i.e., an object). Each single chain of associated data blocks DBs is defined as a data file DF, (for example, $DF_1$), and has a unique identifier (Uuid). The header 100 and trailer 120 of each data block $DB_1$-$DB_N$ belonging to a data file $DF_1$ contains the Uuid of the particular data file $DF_1$-$DF_N$. The data file $DF_1$ maintains a monotonically increasing sequence of numbers, called sequence change numbers (SCNs) (or some other ordering scheme), to establish a unique ordering across data blocks $DB_1$-$DB_N$. As each data block $DB_1$-$DB_n$ for a data file $DF_1$ is stored, it gets a unique ascending sequence number within that data file $DF_1$. The SCN helps identify the most recent data blocks $DB_1$-$DB_n$ even if the SCN within the data file $DF_1$ does not match or for any reason is not consecutive.

Upon reading a data file $DF_1$, the data blocks $DB_1$-$DB_n$ are read back in sequence from the first data block $DB_1$ to the last data block $DB_n$. To the person or application reading the data file DF$_1$ it appears as a single data stream for this single data file DF$_1$. However, in the background, one data block DB$_1$-DB$_n$ at a time is read. Of course, "read-ahead" strategies can be employed to make this process even more efficient.

The secure storage of meta-data is an important aspect of the present invention. In addition to the detailed meta-data stored within the data blocks DB$_1$-DB$_N$, a copy of a subset of the meta-data is also stored centrally for greater reliability and performance. This central repository is the separate configuration disk 18. Preferably, a compact flash disk or flash disk is used as the configuration disk 18. A flash disk is an ideal medium to store all of an appliance's configuration data, as it provides fast and reliable read and write operations. Typically, the reliability of a flash disk is an order of magnitude greater than that of comparable disk media because of the absence of moving parts.

Preferably, the configuration disk 18 is a self-contained storage unit which provides a circular buffer function; whereby outdated data is eventually overwritten by the latest data. As will be explained in detail hereinafter, data stored on the configuration disk 18 is recorded to the configuration disk 18 in the form of transactional records, (i.e., a self-contained record comprising a header followed by the stored data and a trailer).

Figure 4:
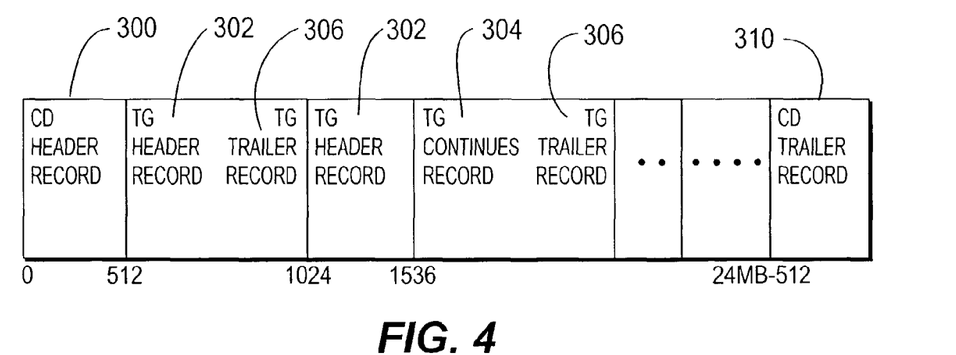
FIG. 4 shows the format of the configuration disk in accordance with an embodiment of the invention.

Referring to FIG. 4, a configuration disk (CD) header 300 is written to the configuration disk 18, before any data files DFs are actually written to the data disk 12, and a CD trailer 310 is written to the configuration disk 18 as the last transaction is completed. Transaction records are recorded on the configuration disk 18 as data files DFs are stored on the data disk 12. These transaction records are later used to restore the appliance to its latest consistent state in the event of an unexpected failure or outage. As is well known by those of skill in the art, a consistent state is defined by every transaction being either done or not done, but nothing is half-way done. For example, if a data block DB is being written and the appliance crashes during the write operation, the last known "consistent state" is before that data block DB was written, since it cannot be guaranteed that the last data block DB was correctly written. If a data file DF with many data blocks DBs is being written and, after some of the data blocks DBs are stored the appliance 8 crashes, then the last known consistent state is that the data file DF was not yet written. It should be noted that this is a high level of granularity in that the data file DF is completely written or it is not written at all; it doesn't matter that some of the data blocks DB were successfully written. Of course, this granularity may be changed to the data block DB level if desired.

In addition to meta-data, the configuration disk 18 may be used to store application-specific data. For example, application-specific data could be the size of a tape library if the system 8 was being used in this context. Alternatively, it could be the number of cars that passed the assembly line if the system 8 was being utilized in a car factory.

In the embodiment of FIG. 4, the configuration disk 18 uses 512 bytes per data block. The first data block in the configuration disk 18 is the CD header record 300 and the last data block is the CD trailer record 310. In between the CD header and trailer records 300, 310 are data blocks 302-306 that begin with either a TG header record 302 or TG continue record 304 followed by a TG trailer record 306. This facilitates a systematic and efficient method verifying and retrieving meta-data. In this embodiment, the TG continue record 304 is used if the meta-data exceeds 512 bytes (i.e. one data block). The configuration disk 18 is a transaction log implemented as a circular buffer. Each transaction group includes a TG header record 302 and a TG trailer record 306. Once the configuration disk 18 is used up, the very next transaction group is recorded at the beginning of the configuration disk 18. Accordingly, in order for the system 8 to know where to start writing a new transaction group. The CD header record 300 comprises a pointer to the last transaction.

In operation, the CD header record 300 is read to determine where to start writing in the configuration disk 18. A TG header record 302 is then written. Once the transaction is completed, such as one or more disk writes, a TG trailer record 306 is written and the CD header 300 is updated to the new location, which is now after the latest transaction. The CD trailer record 310 signifies the end of the configuration disk 18. For redundancy, a copy of some or all of the information stored in the CD header record 300 may also be stored there.

The information stored in the TG header and trailer records 302, 306 is also used during restart. By matching the information in each of the TG header records 302 and the corresponded TG trailer records 306, the system 8 can ensure the data between the TG header and TG trailer records 302, 306 is valid. This is because updates are made sequentially, and the pairing of a TG header record 302 and a TG trailer record 306 therefore ensure standard transactional properties. These standard transactional properties are well known in the art as: atomicity, consistency, isolation and durability, (i.e., ACID properties). During recovery, any TG header record 302 without a corresponding trailer record 306 is assumed to never have happened, (i.e. the transaction is rolled back). The data file DF with the last written TG trailer record 306 is the latest known consistent state.

Figure 5:
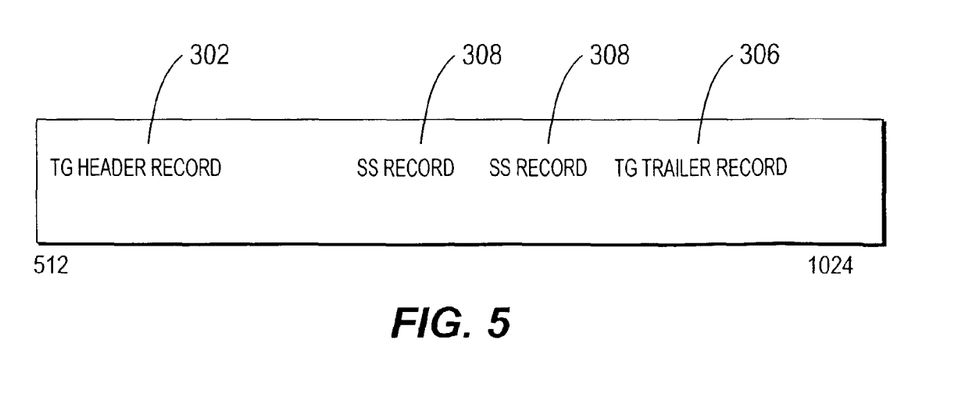
FIG. 5 shows the format of a transaction record in accordance with an embodiment of the invention.

Referring to FIG. 5, between the TG header record 302 and the TG trailer record 306 are one or more state stream (SS) records 308. Preferably, these SS records 308 are written in the same data block, unless a TG continue record 304 extends it to the next data block. In the example of FIG. 5 illustrating data on the configuration disk 18, the data block is 512 bytes long. The size of the transaction group is always a multiple of the block size (in the present example N*512 bytes, where N is an integer greater than or equal to one). Each of these SS records 308 contains the updated or new meta-data related to the appliance.

The essential purpose of the configuration disk 18 is to provide a journaled object store, (hence JOS), or transaction-based, persistent storage repository for configuration and system-wide meta-data (i.e., configuration data that is relevant for the entire JOS, for example for all block groups BGs rather than just one block group BG). Since all write operations are stored as transactions, the configuration disk 18 is extremely robust.

In the event of an abnormal shutdown, the configuration disk 18 will be accurate up to the point of the last completed transaction. Any transactions that started after that point may not have finished and need to be rolled back. If the TG trailer record 306 has been successfully written to the configuration disk 18, the entire transaction must have been successful. This is because every sub-transaction (i.e., SS record 308) is written sequentially after the TG header record 302. Accordingly, if the header record 302 is present without a matching trailer record 306, it is an indication that some part of the transaction must have gone wrong. When the trailer record 306 is written, it is an acknowledgement, (i.e. a receipt or guarantee), that the meta-data was written to the configuration disk 18 and the actual data to the data disk 12. If this guarantee is not received, the system 8 doesn't know how much of the data file DF was written and, in fact, has to assume that none of the data file DF was written.

Table 3 sets forth the different types of meta-data identified above along with their associated function.

TABLE 3

| Meta-Data | Purpose |
| --- | --- |
| Configuration Disk Header and Trailer Records | |
| Magic | Self-identifiable magic number |
| Uuid | Configuration disk Uuid |
| Tgid | The expected TransGroup Id to be found in the offset in configuration disk |
| Tid | The expected Transaction Id to be found at the offset in configuration disk |
| Offset | Offset configuration disk location where the first and subsequent TransGroup records are found |
| Block Size | Disk block size, which is 512 |
| Size | Size of the configuration disk |
| Transaction Group Header, Continue and Trailer | |
| Magic | Self-identifiable magic number |
| TransType | Identifies which of three record types: header, continue or trailer |
| Tgid | Identification for this TransGroup record |
| Uuid | Uuid of the configuration disk |
| Length | Relative offset to the next TransGroup record |
| Data_length | Relative offset to end of the TransGroup Trailer record |
| Transaction Record | |
| Magic | Self-identifiable magic number |
| Tid | Identification for this Transaction record |
| Length | Relative offset to the next Transaction record |
| State Stream Record | |
| Uuid | Uuid of the configurable object |
| Status | Active or Deleted |
| Length | Length of the State Stream record |

The TG header and trailer records 302, 306 comprise two consolidation points which enable the system 8 to restore the appliance to its latest consistent state. During a disaster recovery, the system 8 retrieves all the TG header and trailer records 302, 306 to ensure that they are all paired and to determine which pair is the most current. The CD header 300 contains a pointer to the TG trailer record 306 of the last completed transaction.

Figure 6:
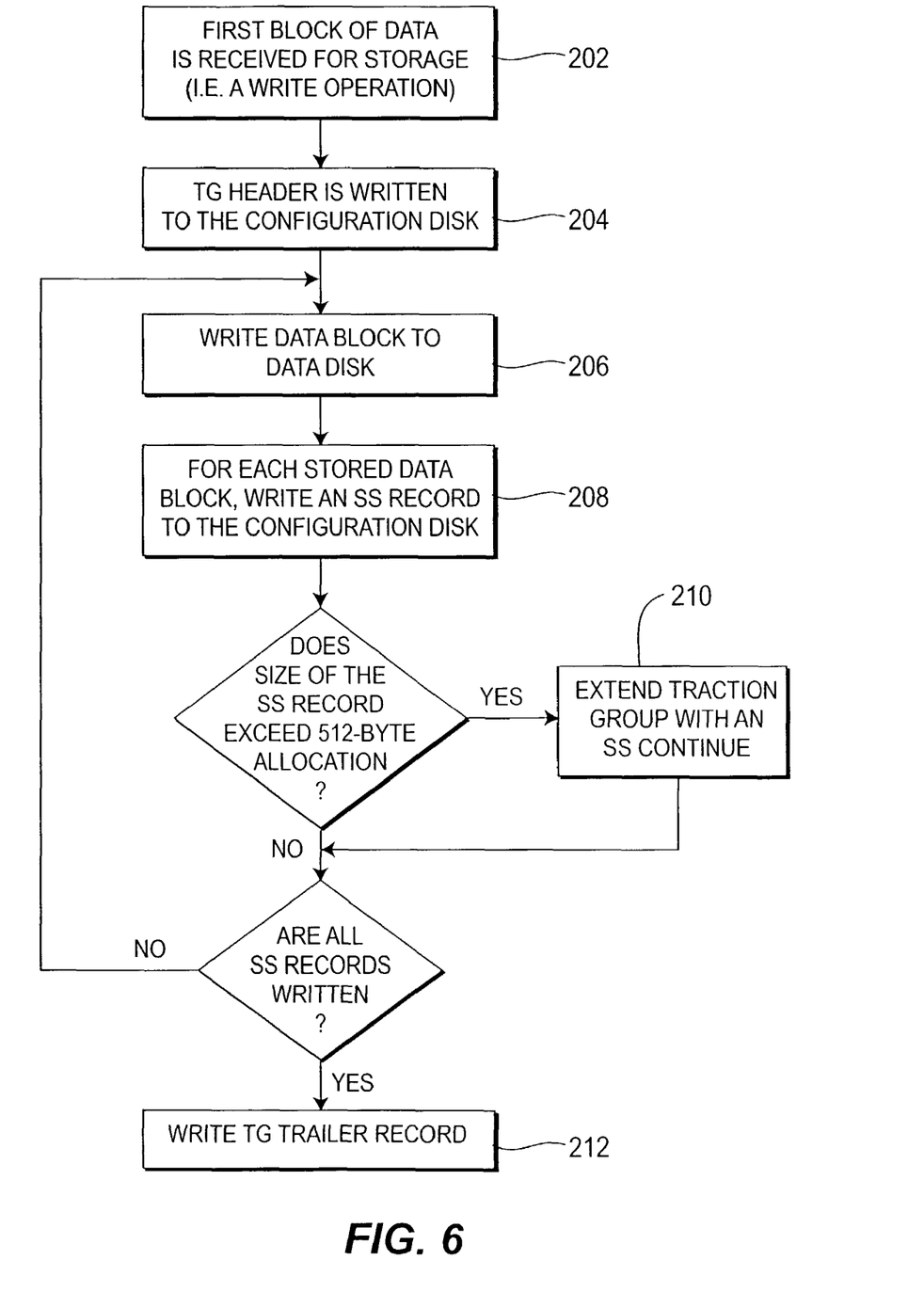
FIG. 6 is a procedure for generating a written transaction record in accordance with an embodiment of the present invention.

The procedure for generating a written transaction record in accordance with the present invention is shown in FIG. 6. As each data block DB is received by the system 8, a transaction group is stored in the configuration disk 18 as follows: a TG header 302 is written to the configuration disk 18 at the beginning of the next available 512-byte block to initiate the transaction (step 204). Data is written to the data disk 12 one 1-MB block at a time (step 206). For simplicity, this description of the method 200 does not differentiate between data block headers 100, data blocks $DB_1$-$DB_M$ and data block trailers 120. For each data block DB, an SS record 308 is written to the configuration disk 18 to indicate the progress or sub-transactions (step 208). If at any time the size of the SS records 308 exceed the size of the 512-byte configuration disk block, the transaction group is extended with a TG continue record 304 (step 210). This could happen multiple times for a large transaction group. Once all SS records 308 are written, (i.e. when the data file DF is completely stored on the data disk 12), a TG trailer record 306 is written to the configuration disk 18 (step 12). This finalizes the transaction and the write is acknowledged.

As aforementioned, the CD header 300 and trailer 310 are not used to store transactional information. Their function is to identify the currently active region within the configuration disk 18. It should also be noted that the SS records 308 could also identify sub-transactions other than writing a block to the configuration disk 18. The SS records 308 simply denote one entry in the transaction group.

When the system 8 recovers from a failure, the latest consistent state can be recovered as fine-grained as desired. For example, for an application as a tape library, very coarse grained recovery can be used and the system 8 rolls back to the latest file mark, (i.e., a TG trailer record 306 in the configuration disk 8). To implement a recovery, the system ignores all of the disk transaction records that occurred after the last TG trailer record 306. This is appropriate for backup applications that expect transaction boundaries to be file marks; either the data file DF was backed up or it wasn't. If only parts of the data file DF were backed up it is considered not to be backed up at all.

The ability of the present invention to handle large sequential data files provides significant advantages over regular file systems.

With respect to performance, the present invention writes detailed meta-data with each data block DB. Typical prior art data storage systems distinguish between meta-data and regular data, and store meta-data in different data blocks. Since meta-data blocks are kept separate from the actual data blocks, they are typically spread out throughout the disk. This means that every data file write actually involves at least two writes; one that updates the data and at least another one that updates the meta-data. In the system of the present invention, there is only a single write for data and meta-data that is stored together. Since there is no "seeking" of meta-data blocks, a single contiguous write is used.

Additionally, a reduced set of all of the meta-data within each of the data blocks DBs is also stored together on the configuration disk 18. Writes to the configuration disk 18 are negligible compared to data disk 12 writes because the writes are much smaller and the configuration disk 18 is typically a non-volatile memory that is significantly faster than the data disk 12. The configuration disk 18 keeps a reduced set of the meta-data of each large allocation area, (i.e., the 1 GB blocks referred to hereinbefore), rather than every data block DB. For example, a 40 GB hard drive would require only 40 entries in the configuration disk.

Another performance enhancement feature of the present invention is related to the large block size. Since the block size is orders of magnitude larger than the block size of ordinary file systems, the advantages of the invention are further magnified. Typical prior art file systems cannot use such large blocks because the block size is the smallest logical unit the file system can write. If many small data files need to be stored, as is typical for an enterprise system, each data file still takes up at least the size of one block. For example, a 1 kb file would take up 1 MB of space, 1023 kb are wasted. Clearly, this is not acceptable for general-purpose systems. In contrast, the system of the present invention is optimized specifically for large sequential data files because backup applications group together these 1 kb files into large, contiguous data files. With these types of access patterns, a large percentage of space will rarely be wasted.

Prior art disk caches often have to be disabled since it is possible that the disk acknowledges a write before it has propagated from the disk cache to a persistent state. If many small files are written, the file system has to flush the disk cache constantly for consistency before it acknowledges the write to the file. This happens so frequently when many small files are stored that disk caches are simply disabled. In contrast, since the present invention expects a small number of large files, it can make full use of disk caches. Cache flushes become infrequent, (i.e. only at the end of a file to finalize the transaction). This can improve sequential write performance by an order of magnitude.

Another significant advantage of the present invention is increased reliability in the ability to recover from a corrupted configuration disk 18. Detailed meta-data is written along with each data block, less detailed meta-data into the configuration disk 18. The configuration disk 18 contains a list of the large 1 GB allocation areas that are used to store individual data blocks DBs of a data file DF. One data file DF could cover one or more of these areas. It is not necessary to store detailed meta-data, (for example a list of each data block DB that belongs to a data file DF), into the configuration disk 18 because all of the detailed meta-data is already stored with the data on the data disk 12. In order to access a data file DF, the configuration disk 18 is read to find the first allocation area of the data file DF. Due to this architecture, it is very easy to recover from a corrupt configuration disk 18. The data disk 12 is scanned, and from the detailed meta-data stored in the data blocks DBs, a list of allocation blocks for each data file DF is created again to recover the meta-data of the configuration disk 18. This is not possible in typical prior art file systems because the meta-data is spread throughout the disk. If certain blocks of this meta-data are lost, the disk becomes useless.

In the same manner, the system of the present invention can easily cope with removable or corrupt disks. If one of the data disks 12 is removed, the data disk 12 contains all of its detailed meta-data. If the disk is imported into another JOS system, it can be scanned and used there. Also, because only meta-data that is specific for data on that particular data disk 12 is removed from the JOS, the system 8 still has all the necessary information to continue running in this degraded state. All data files DFs that are stored on other data disks 12 are guaranteed to still be fully operational. Typical prior art file systems cannot handle such a situation since meta-data is spread over all disks. Accordingly, if one disk is removed, the entire file system is corrupt.

Finally, with respect to scalability, file systems almost always keep data structures that can address every block on the disk. For example, a 32 bit system with 1 k data blocks can address $2^{32-1}*1$ Kb (about 2 tera bytes—a small/medium sized tape library). Since the present invention uses 1 MB blocks, it can address several peta bytes, using the same logic, (larger than some of the largest tape libraries). To even further increase this address space, the configuration disk only contains pointers to 1 GB allocation units.

What is claimed is:

1. A method comprising:
   receiving a data container to be stored to a first nonvolatile storage device, wherein the first nonvolatile storage device contains a plurality of block groups;
   selecting a block group from the plurality of block groups, wherein each of the plurality of block groups allows sequential allocation of data blocks for storing the data container to the first nonvolatile storage device;
   storing data and associated metadata of the data container together to the selected block group of the plurality of block groups as a single write to contiguous data blocks within the selected block group;
   storing a transactional record to a second nonvolatile storage device physically separate from the first nonvolatile storage device, wherein the transactional record corresponds to the single write and contains a header and a corresponding trailer, wherein the header and trailer contain a copy of a subset of the metadata of the data container, wherein the transactional record enables storage of a subset of the metadata in the second nonvolatile storage medium in addition to storage of a complete copy of the metadata in the first non-volatile storage medium, wherein the header is stored to the separate second nonvolatile storage device at a time before the storing of the data container to the first nonvolatile storage device, and the trailer is stored to the separate second nonvolatile storage device at a time after the storing of the data container to the first nonvolatile storage device, and wherein successfully storing the trailer to the second nonvolatile storage device indicates the write has completed without errors;
   checking to determine whether the trailer was successfully stored in the second nonvolatile storage device;
   committing the storing of the data container to the first nonvolatile only when the trailer has been determined to be successfully stored in the second nonvolatile storage device; and
   nullifying the storing of the data container to the first nonvolatile storage device upon failure to successfully store the trailer to the second nonvolatile storage device, wherein failure to store the trailer to the second nonvolatile storage device indicates at least part of the data container has failed to be stored to the selected block group of the plurality of data blocks without errors.

2. The method as recited in claim 1, further comprising:
   during disaster recovery, upon detecting the transactional record having the header without the corresponding trailer, rolling-back the storing of the data container to the plurality of data blocks to restore the first nonvolatile storage device to a consistent state.

3. The method as recited in claim 1, further comprising:
   retrieving the plurality of data blocks in a single data stream by using a sequential change number (SCN) stored in each of the plurality of data blocks.

4. The method as recited in claim 1, wherein the block group is selected round-robin from the plurality of block groups.

5. The method as recited in claim 1, wherein the block group contains metadata of the first nonvolatile storage device, and the metadata can be used for recovery of the first nonvolatile storage device.

6. The method as recited in claim 1, wherein each of the plurality of block groups contains metadata of the first nonvolatile storage device allowing recovery of the first nonvolatile storage device upon recovery of the metadata from any one of the plurality of block groups.

7. The method as recited in claim 1, wherein the block group contains an identifier for deleted data containers, and the identifier identifies data blocks that have been previously used by the deleted data containers.

8. The method as recited in claim 1, wherein the header and a trailer are used for verifying the integrity of the corresponding data block.

9. The method as recited in claim 8, wherein the header and the trailer of the corresponding data block contain metadata capable of being used for recovery of the corresponding data block.

10. The method as recited in claim 8, wherein the header and the trailer of the corresponding data block contain metadata capable of being used for recovery of the data container stored on the corresponding data block.

11. The method as recited in claim 1, wherein data of the data container and metadata of the data container are stored in the corresponding data block in a single contiguous write transaction.

12. The method as recited in claim 1, wherein at least some of the metadata of the first nonvolatile storage device is duplicated in the configuration disk.

13. The method as recited in claim 1, wherein the second nonvolatile storage device stores data in a circular buffer fashion by overwriting outdated data with most recent data.

14. The method as recited in claim 1, wherein the header and the trailer of the transactional record contain metadata of the data container capable of being used for recovery of the data container.

15. The method as recited in claim 1, wherein the data container is a data file.

16. A system comprising:
a data disk for storing a data container, wherein the data disk contains a plurality of block groups, each of the plurality of block groups allows sequential allocation of data blocks for storing the data container to the data disk;
a configuration disk physically separate from the data disk for storing a transactional record corresponding to the storing of the data container to the data disk, wherein the transactional record contains a header and a corresponding trailer to be stored in the configuration disk separate from data of the data container stored in the data disk, wherein the header is stored to the separate configuration disk at a time before the storing of the data container to the data disk, and the trailer is stored to the separate configuration disk at a time after the storing of the data container to the data disk, wherein successfully storing the trailer to the configuration disk indicates .the write has completed without errors; and
a controller configured to:
select one of the plurality of block groups from the data disk;
sequentially allocate a plurality of data blocks from the selected block group;
to store data and associated metadata of the data container together to the plurality of data blocks as a single write to contiguous blocks within the selected one of the plurality of block groups;
to store the transactional record to the configuration disk wherein the transactional record corresponds to the single write and contains a header and a corresponding trailer, wherein the header and trailer contain a copy of a subset of the metadata of the data container, wherein the transactional record enables storage of a subset of the metadata in the configuration disk in addition to storage of a complete copy of the metadata in the separate data disk;
to check whether the trailer was successfully stored in the configuration disk; and
to commit the storing of the data container to the data disk only when the trailer of the has been successfully stored to the separate configuration disk, and
to nullify the storing of the data container to the data disk upon failure to successfully store the trailer to the configuration disk, wherein failure to successfully store the trailer to the configuration disk indicates at least part of the data container has failed to be stored to the selected block group of the plurality of data blocks without errors.

17. The system as recited in claim 16, wherein during disaster recovery, the controller rolls back the storing of the data container to the plurality of data blocks upon detecting the transactional record having the header without the corresponding trailer.

18. The system as recited in claim 16, wherein each of the plurality of block groups contains metadata of the data disk, and the metadata can be used for recovery of the data disk.

19. The system as recited in claim 16, wherein each of the plurality of data blocks contains metadata of the data container, and the metadata can be used for recovery of the data container.

20. The system as recited in claim 16, wherein the configuration disk contains metadata of the data disk, and the metadata can be used for recovery of the data disk.

21. A method comprising:
receiving a data container to be stored to a first non-volatile storage medium, wherein the first non-volatile storage medium contains a plurality of block groups;
selecting a block group from the plurality of block groups, wherein each of the plurality of block groups allows sequential allocation of data blocks for storing the data container to the first non-volatile storage medium;
storing data of the data container and associated metadata together to contiguous data blocks in the selected block group of the first non-volatile storage medium as a single contiguous write, the metadata including one or more of a UUID associated with the first non-volatile storage medium, an offset indicator associated with the data container, a sequence change number associated with the data container, a resource fork length associated with the storage container, or an indicator of unused memory within a given block group;
storing a transactional record to a second nonvolatile storage medium, wherein the second nonvolatile storage medium is physically separate from the first non-volatile storage medium and has access characteristics different from those of the first nonvolatile storage medium, wherein the transactional record contains a header and a corresponding trailer associated with the write, wherein the header and trailer contain a copy of a subset of the metadata of the data container, wherein the transactional record enables storage of a subset of the metadata in the second nonvolatile storage medium in addition to storage of a complete copy of the metadata in the first nonvolatile storage medium, wherein the header is stored to the second nonvolatile storage medium at a time before the storing of the data container to the first nonvolatile storage medium and the trailer is stored to the second nonvolatile storage medium at a time after the storing of the data container to the first nonvolatile storage medium, and wherein successfully storing the trailer to the second nonvolatile storage medium indicates the write has completed without error;
checking to determine whether the trailer was successfully stored in the second nonvolatile storage medium; and
committing the storing of the data container and associated metadata to the first non-volatile storage medium only when the transactional record was successfully stored to the second non-volatile storage medium; and
nullifying the storing of the data container to the data disk upon failure to store the trailer to the second nonvolatile storage medium at the time after the storing of the data container to the data disk, wherein failure to store the trailer to the second nonvolatile storage medium indicates at least part of the data container has failed to be stored to the selected block group of the plurality of data blocks without errors.

22. The method as recited in claim 21, further comprising, during disaster recovery and upon detecting the transactional record having the header without the corresponding trailer, rolling-back the storing of the data container to the plurality of data blocks to restore the first non-volatile storage medium to a consistent state.

23. The method as recited in claim 22, wherein each of the plurality of block groups contains metadata of the first non-volatile storage medium allowing recovery of the first non-volatile storage medium upon recovery of the metadata from any one of the plurality of block groups.

24. The method as recited in claim 22, wherein the block group contains an identifier for deleted data containers, and the identifier identifies data blocks that have been previously used by the deleted data containers.

25. The method as recited in claim 22, wherein the header and the corresponding trailer are used for recovery of the data container stored in the corresponding data block.

26. The method as recited in claim 22, wherein the second non-volatile storage medium is a configuration disk that stores data in a circular buffer by overwriting outdated data with most recent data.

27. The method as recited in claim 22, wherein the data container is a data file.

* * * * *